United States Patent
Chang et al.

(10) Patent No.: US 8,106,889 B2
(45) Date of Patent: Jan. 31, 2012

(54) TOUCH-SCREEN DISPLAY DEVICE AND METHOD THEREOF

(75) Inventors: Se In Chang, Suwon-si (KR); Wal Hee Kim, Yongin-si (KR); Sang Hee Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1196 days.

(21) Appl. No.: 11/538,843

(22) Filed: Oct. 5, 2006

(65) Prior Publication Data

US 2008/0068342 A1   Mar. 20, 2008

(30) Foreign Application Priority Data

Apr. 20, 2006   (KR) ........................ 10-2006-0035659

(51) Int. Cl.
*G09G 5/00* (2006.01)
(52) U.S. Cl. ..................................................... 345/173
(58) Field of Classification Search .......... 345/173–179; 178/18.01, 18.03; 349/12
See application file for complete search history.

(56) References Cited

U.S. PATENT DOCUMENTS

| | | | | |
|---|---|---|---|---|
| 6,016,134 A * | 1/2000 | Ota | ............................... | 345/173 |
| 6,522,322 B1 * | 2/2003 | Maeda et al. | .................. | 345/173 |
| 6,765,629 B1 * | 7/2004 | Jeong et al. | .................... | 345/173 |
| 2003/0160768 A1 * | 8/2003 | Tanabe et al. | ................. | 345/173 |
| 2004/0011713 A1 * | 1/2004 | Ushioda et al. | | |
| 2004/0095332 A1 * | 5/2004 | Blanchard | ..................... | 345/173 |

* cited by examiner

*Primary Examiner* — Regina Liang
(74) *Attorney, Agent, or Firm* — Cantor Colburn LLP

(57) ABSTRACT

A touch-screen display device includes a display panel, a touch panel, and an adhesive member. The display panel has a peripheral area surrounding an effective area. The touch panel is separated from and faces the display panel. The adhesive member has an adhesive part disposed along the peripheral area and an airing portion disposed along a portion of the peripheral area. The adhesive part adheres the touch panel and the display panel together. The airing portion blocks a particle from entering into a space between the touch panel and the display panel, and inflows and outflows air from the exterior to the space. Therefore, the touch panel and the display panel are coupled by the adhesive member having an airing portion formed thereon, so that a display error may be prevented.

20 Claims, 8 Drawing Sheets

TOUCH-SCREEN DISPLAY DEVICE AND METHOD THEREOF

This application claims priority to Korean Patent Application No. 2006-35659, filed on Apr. 20, 2006 and all the benefits accruing therefrom under 35 U.S.C. §119, and the contents of which in its entirety are herein incorporated by reference.

BACKGROUND OF THE INVENTION

1. Field of the Invention

The present invention relates to a touch-screen display device and a method thereof. More particularly, the present invention relates to a touch-screen display device capable of maintaining display quality during a touch screen function, and a method thereof.

2. Description of the Related Art

Generally, a display device converts electrical signals that are provided from an information-processing device into images. Each of a conventional display device and a conventional information process device has only the uni-directional communication type. Therefore, in order to display new images on the display device, a data input device such as a keyboard, a keypad, a mouse apparatus, etc., has been required.

Recently, one of the display devices that have been developed has a function to re-structure an image. For example, when a user has inputted a command to a screen that has displayed an image, a signal corresponding to information is outputted to an information process device, and then an image is re-structured. That is, a bi-directional communication between the display device and the information-processing device has been developed.

A display device having a display panel and a touch panel disposed thereon is mainly used as the bi-directional type display device, so called a touch-screen display device. The touch panel detects a position selected by the user with respect to information displayed on the display panel.

The touch panel is separated by a predetermined interval from the display panel, and the predetermined interval is maintained between the touch panel and the display panel by using a frame or a bonding agent. Here, a space between the touch panel and the display panel is closed by the frame or the bonding agent, however an air would be inflowed and outflowed through a fine gap from the exterior to the space or vice versa.

For example, when an aircraft conveys the touch-screen display device, an air pressure in the aircraft is lower than an atmospheric pressure in a very high altitude. Here, an air is outflowed from the space between the touch panel and the display panel to the exterior, which is inflowed to the space in an atmospheric condition. A conveying time by the aircraft is long and an air is outflowed through a fine gap, so that a time for an external low air pressure to become equal to an internal air pressure is enough.

Then, when the aircraft lands, a peripheral pressure of the touch-screen display device is fastly reconverted to the atmospheric pressure. At this time, owing to an interval between an internal pressure and an external pressure of the touch-screen display device, the touch panel and the display panel become stuck at one portion area of the touch-screen display device, and the touch panel and the display panel are maintained by a predetermined interval in another portion area thereof. Then, the touch panel is not restored to the original state because of a static electricity between the touch and display panels and the pressure interval between the internal and external sides.

For another example, when the user touches the touch panel, an air disposed between the touch panel and the display device is outflowed from the touch-screen display device through a fine gap, and then the touch panel becomes stuck to the display panel. Then, the touch panel is not restored to the original state because of static electricity between the touch and display panels and the pressure interval between the internal and external sides. The internal air is easily outflowed through the fine gap using a pressing force of the touch panel by a user's finger, however a force restitution of the touch panel, by making inflow by an external air to the space between the touch panel and the display panel through the fine gap, is relatively insufficient.

As a result, a distortion image displayed in the display panel of the touch-screen display device may be observed, or an information input error through the touch panel may frequently occur in the touch-screen display device.

BRIEF SUMMARY OF THE INVENTION

The present invention provides a touch-screen display device capable of preventing an error that reduces a display quality that is occurred by a variation of an external pressure by having a touch panel and a display panel that are coupled by an adhesive member having an airing portion formed thereon.

The present invention also provides a method of maintaining display quality during a touch-screen function of a touch-screen display device.

In exemplary embodiments of the present invention, a touch-screen display device includes a display panel, a touch panel, and an adhesive member. The display panel has an effective area and a peripheral area that surrounds the effective area. The touch panel is separated from the display panel. The touch panel faces the display panel. The adhesive member has an adhesive part disposed along to the peripheral area and an airing portion (or a porous portion) disposed along to a portion of the peripheral area. The adhesive part adheres the touch panel and the display panel to each other. The airing portion blocks a particle into a space between the touch panel and the display panel, and provides inflow and outflow for air from the exterior to the space.

In one exemplary embodiment, the adhesive member is an adhesive tape disposed between the display panel and the touch panel, which is disposed at an area corresponding to the peripheral area. The airing portion may include a non-woven fabric, and may be disposed between the display panel and the adhesive tape. The display panel includes a first substrate, a second substrate, a liquid crystal layer, and a polarization film. The first substrate faces the touch panel. The second substrate is disposed between the first substrate and the touch panel. The adhesive member is disposed on one surface of the second substrate facing the touch panel. The liquid crystal layer is disposed between the first substrate and the second substrate. The polarization film is disposed between the second substrate and the adhesive film. The airing portion may contact the polarization film.

In another exemplary embodiment, the airing portion is disposed between the touch panel and the adhesive film. In further another exemplary embodiment, a portion of the adhesive film corresponding to the touch panel is exposed, and the airing portion that is disposed in the portion of the adhesive film contacts the touch panel and the display panel.

In another exemplary embodiment, the adhesive part may be a bonding agent disposed between the display panel and the touch panel. The airing portion may be a non-linear airing path between the exterior and the space. The airing portion may maintain an internal air pressure of the space to be substantially equal to that of the exterior.

In other exemplary embodiments of the present invention, a touch-screen display device includes a display panel, a touch panel, and an adhesive member. The display panel has an effective area and a peripheral area surrounding the effective area. The touch panel is separated from the display panel. The touch panel faces the display panel. The adhesive member is disposed along the peripheral area to adhere the touch panel and the display panel to each other. The adhesive member has an airing path formed thereon. The airing path blocks a particle from entering into a space between the touch panel and the display panel, and provides inflow and outflow of air from the exterior to the space.

In one exemplary embodiment, the adhesive member includes a first adhesive tape and a second adhesive tape disposed along the peripheral area. The airing path is defined by a first end portion of the first adhesive tape, a second end portion of the second adhesive tape facing the first end portion, the display panel, and the touch panel. A length of the airing path is greater than a width of the first and second adhesive tapes. The first end portion is formed with a first embossing shape, and the second end portion is formed with a second embossing shape that is engaged to the first embossing shape. An interval gap between the first end portion and the second end portion is about 0.09 mm to about 0.11 mm.

In other exemplary embodiments of the present invention, a method of maintaining display quality of a touch-screen display device during a touch-screen function includes providing an adhesive member between the touch panel and the display panel in an area corresponding to a peripheral area of a display area of the display panel, disposing an airing portion within at least a portion of the area corresponding to the peripheral area, maintaining an internal pressure of a space between the touch panel and the display panel to be substantially equal to an external pressure of air exterior to the touch-screen display device by passing air between the space and the exterior through the airing portion, and blocking a particle from entering the space through the airing portion.

In one exemplary embodiment, disposing an airing portion includes providing a tissue having airing characteristics between the touch panel and the display panel and blocking a particle from entering the space includes stopping the particle at the tissue.

In another exemplary embodiment, disposing an airing portion includes providing a non-linear conduit between the exterior and the space and blocking a particle from entering the space includes trapping the particle in a bend of the non-linear conduit.

According to the touch-screen display device, the touch panel and the display panel are coupled to each other via the adhesive member having an airing portion formed thereon, so that a displaying error may be prevented.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
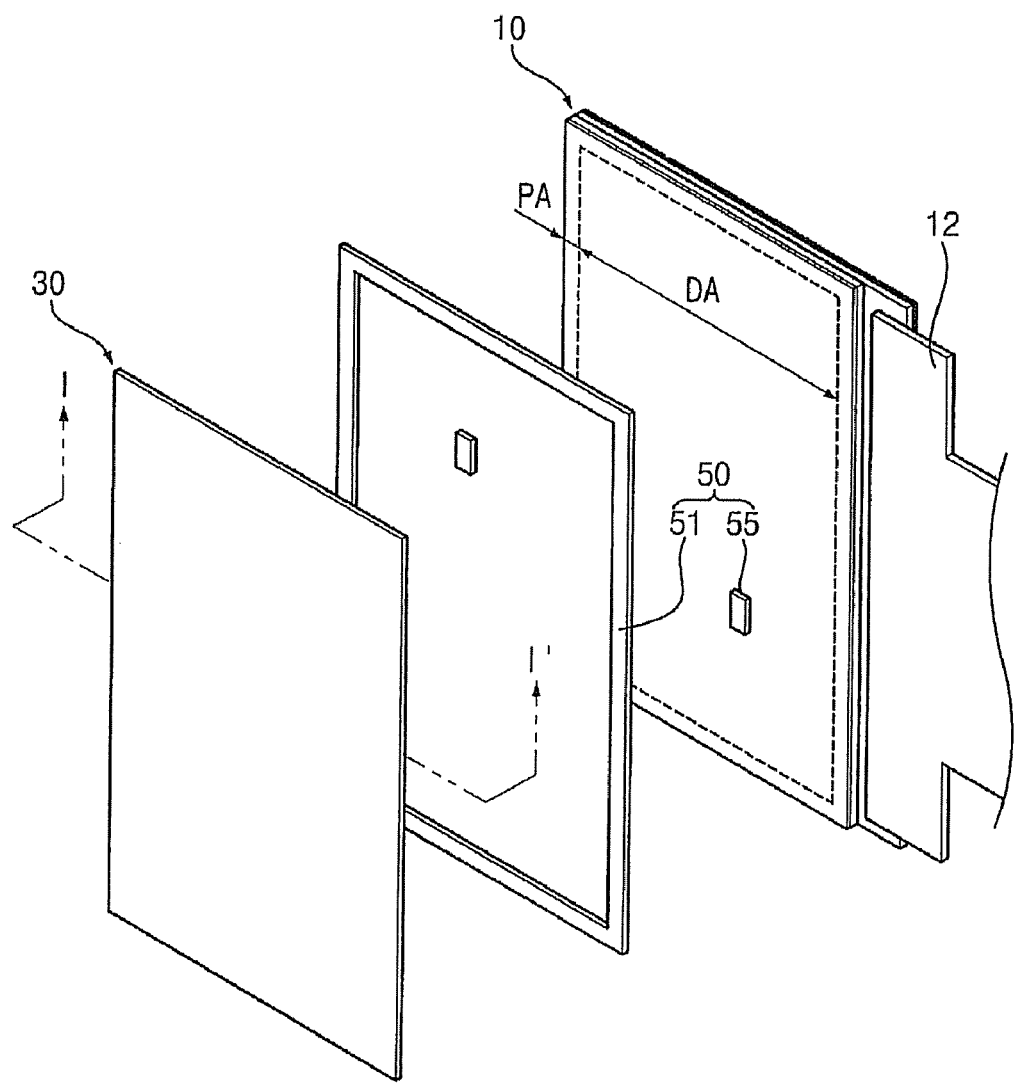
FIG. 1 is an exploded perspective view illustrating an exemplary touch-screen display device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
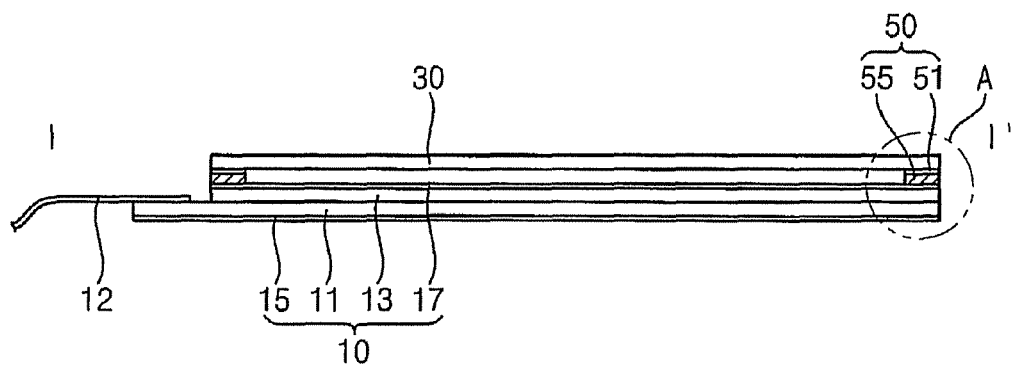
FIG. 2 is a cross-sectional view taken along line I-I' in FIG. 1.

FIG. 1 is an exploded perspective view illustrating an exemplary touch-screen display device according to an exemplary embodiment of the present invention. FIG. 2 is a cross-sectional view taken along line I-I' in FIG. 1.

Referring to FIGS. 1 and 2, a touch-screen display device includes a display panel 10, a touch panel 30, and an adhesive member 50.

The display panel 10 displays an image using an image data signal provided from a driving circuit section (not shown) and a light source such as sunlight or an artificial light that is provided from a rear side thereof. The display panel 10 may have a rectangular shape. The display panel 10 includes an effective display area DA and a peripheral area PA that surrounds the effective display area DA. The effective display area DA may have a rectangular shape that is smaller than a front face of the display panel 10. The display panel 10 includes a first substrate 11, a second substrate 13, a liquid crystal layer (not shown), a first polarization film 15, and a second polarization film 17.

The first and second substrates 11 and 13 may have a rectangular shape, and face each other. The liquid crystal layer is disposed between the first and second substrates 11 and 13. The first substrate 11 includes a plurality of pixel electrodes corresponding to the effective display area DA and a plurality of switching elements that control each of the pixel electrodes, respectively. The second substrate 13 includes a light blocking pattern, a color filter and a common electrode. The light-blocking pattern is formed in a matrix shape that includes opening portions corresponding to the pixel electrodes so as to block a leakage of a light supplied to the light-blocking pattern. The color filter is formed on a portion of the second substrate corresponding to the pixel electrodes. Alternatively, the color filter may be formed on the first substrate 11. The color filter may include red color filters, green color filters, and blue color filters. The common electrode of the second substrate 13 faces the pixel electrodes of the first substrate 11. Alternatively, the common electrode and the pixel electrodes may be formed in stripes on the first substrate 11. A flexible printed circuit board 12 is connected to an end portion of the first substrate 11.

The first polarization film 15 is attached to a rear surface of the first substrate 11, and polarizes a rear light that is incident to the liquid crystal layer. The second polarization film 17 is attached to a front surface of the second substrate 13, and polarizes a light that is transmitted to the liquid crystal layer and the color filter.

The touch panel 30 detects a position of an indicating content that is selected by a user with respect to information that is displayed on the display panel 10. The touch panel 30 is laminated on the second substrate 13 that displays an image. The touch panel 30 includes a lower substrate, an upper substrate, a lower transparent electrode and an upper transparent electrode. The lower substrate of the touch panel 30 is disposed on the second polarization film 17 of the display panel 10. The upper substrate of the touch panel 30 is separated by a predetermined interval from the lower substrate of the touch panel 30. Each of the lower and upper transparent electrodes is formed on the lower substrate and the upper substrate, respectively, facing each other.

Figure 3:
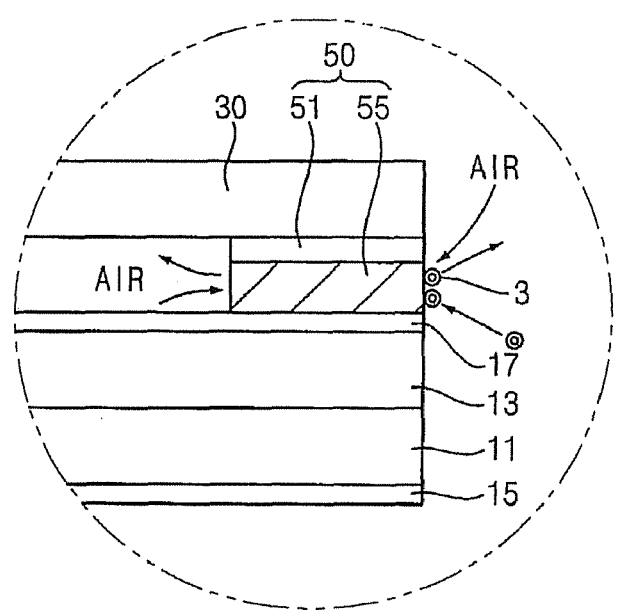
FIG. 3 is an enlarged view illustrating portion 'A' shown in FIG. 2.

FIG. 3 is an enlarged view illustrating portion 'A' shown in FIG. 2.

Referring to FIGS. 1 to 3, the adhesive member 50 secures the touch panel 30 to the display panel 10. The adhesive member 50 includes an adhesive part 51 and an airing portion (or a porous portion) 55. In the present embodiment, the adhesive part 51 may be a double-sided adhesive tape or film. In the exemplary embodiments described herein, the terms adhesive tape and adhesive film may be used interchangeably, and both may refer to strips of adhesive material used for the adhesive part 51. Alternatively, the adhesive part 51 may be a bonding agent.

The adhesive part 51 is disposed between the second polarization film 17 of the display panel 10 and the lower substrate of the touch panel 30 along the peripheral area PA. The adhesive part 51 may surround an entire periphery, or substantially an entire periphery, surrounding the display area DA so as to prevent debris or fine particles from coming between the display panel 10 and the touch panel 30. The second polarization film 17 and the lower substrate are coupled to each other by the adhesive part 51, so that the touch panel 30 is secured on the display panel 10.

The touch panel 30 is separated by a predetermined interval from the display panel 10. The adhesive part 51 closes a circumference of a space between the touch panel 30 and the display panel 10.

The airing portion 55 blocks a foreign substance such as a fine particle 3 from an exterior (external side) from flowing into a space between the touch panel 30 and the display panel 10. The airing portion 55 inflows air from the exterior to the space, and outflows air from the space to the exterior.

The airing portion 55 may be an airing structure that is integratedly formed with the adhesive part 51 or an additional member different from the adhesive part 51. In the illustrated embodiment, the airing portion 51 is an additional member such as an airing tissue that is additionally attached to the adhesive part 51. For example, the airing tissue may be a non-woven fabric.

The non-woven fabric may be manufactured by mixing main fibers that are arranged along a non-determined direction and binder fibers without a woven fabrics process. The non-woven fabric is manufactured by manufacturing processes such as a wet method, a dry method, and so on. In the wet method, the non-woven fabric is manufactured by heating and pressing, similar to a paper manufacturing process. In the dry method, the non-woven fabric is manufactured by heating and drying after removing synthetic resins from fabric manufactured with a thin shape of a cotton wool. When the non-woven fabric has airing characteristics, a particle 3 such as dust may not pass through the non-woven fabric because the non-woven fabric has fibers of non-determined direction and is tangled.

When the airing portion 55 is disposed in the adhesive part 51, the airing portion 55 is disposed in a portion of the peripheral area PA. A disposing position and number of the airing portion 55 may be alternated by a gap between the touch-panel 30 and the display panel 10. In the illustrated embodiment, two airing portions 55 are provided, and each of the airing portions 55 is disposed in a central portion of the peripheral area PA corresponding to two long sides of the display panel 10, respectively, and is disposed between the adhesive part 51 and the second polarization film 17. Alternate quantities and positionings of the airing portions 55 would also be within the scope of these embodiments.

A width of the airing portion 55 may be smaller or equal to a width of the peripheral area PA. A first end surface of the airing portion 55 makes contact with an external side of the touch-screen display device, and a second end surface of the airing portion 55 is exposed to a space between the touch panel 30 and the display panel 10.

An air pressure of a space between the touch panel 30 and the display panel 10 corresponds to an external pressure of the touch-screen display device because the airing portion 55 has air permeability. That is, the air pressure exterior to the touch-screen display device corresponds to the air pressure of the space between the touch panel 30 and the display panel 10. For example, when the external pressure of the touch-screen display device is lower than the atmospheric pressure, an air is exhausted via the airing portion 55 from the space between the touch panel 30 and the display panel 10 to an exterior. Then, when the external pressure is higher than the air pressure of the space, an air is inflowed via the airing portion 55 from the exterior to the space. Therefore, an external pressure is substantially equal to an internal pressure, so that the touch panel 30 is not cohered on the display panel 10. Furthermore, when the touch panel 30 is cohered on the display panel 10 by the user's touch, the external air is influxed to the space through the airing portion 55 by a dynamic stability of the touch panel 30, so that the touch panel 30 may be easily restored to the former state.

Figure 4:
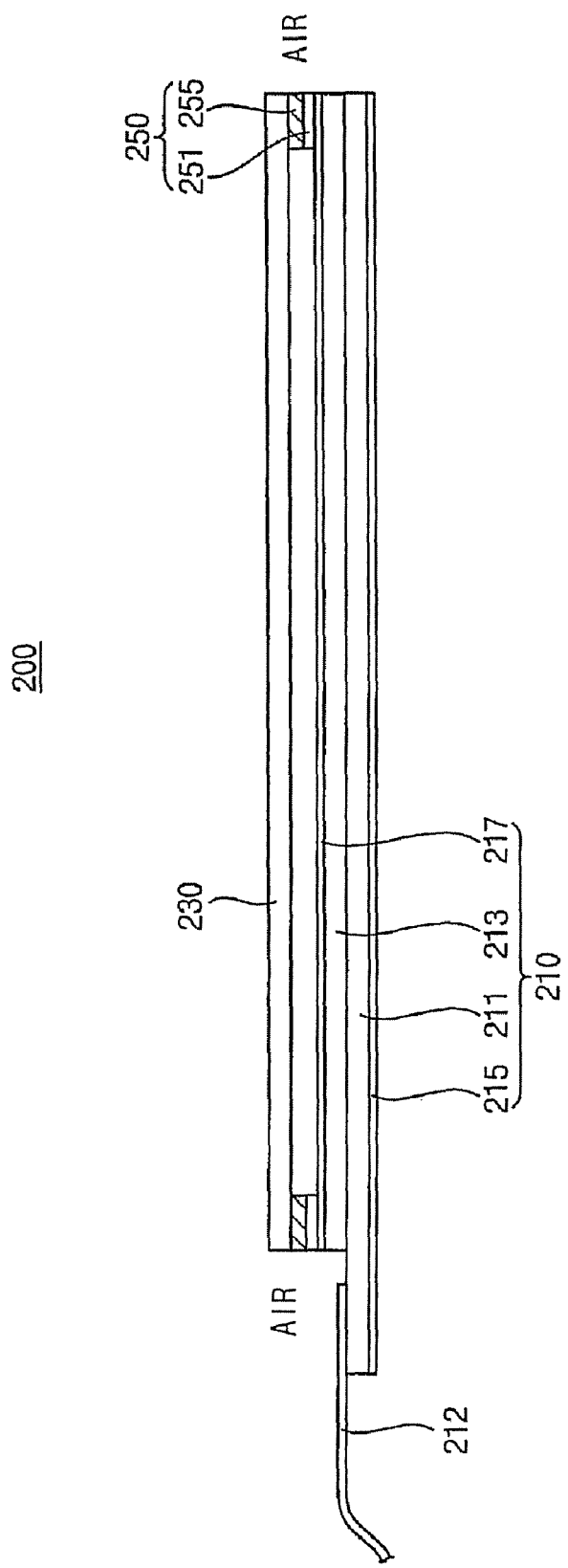
FIG. 4 is a cross-sectional view illustrating an exemplary touch-screen display device according to an exemplary embodiment of the present invention.

FIG. 4 is a cross-sectional view illustrating an exemplary touch-screen display device according to an exemplary embodiment of the present invention.

Referring to FIG. 4, a touch-screen display device 200 includes a display panel 210, a touch panel 230, a first polarization film 215, a second polarization film 217, an adhesive member 250, and a flexible printed circuit board 212.

The touch-screen display device 200 is substantially the same as the touch-screen display device described with respect to FIGS. 1 to 3 except a disposing position of the adhesive part 251 and the airing portion 255.

Accordingly, the first substrate 211, the second substrate 213, and the second polarization film 217 are sequentially disposed on the first polarization film 215, and the liquid crystal layer is interposed between the first and second substrates 211 and 213.

The touch panel 230 is disposed separately from the second polarization film 217.

The adhesive member 250 is disposed between the second polarization film 217 and the touch panel 230 in correspondence to a peripheral area PA that is defined in the display panel 210. The adhesive member 250 includes an adhesive part 251 and an airing portion 255. The adhesive part 251 is, for example, an adhesive tape or film. Alternatively, the adhesive part 251 is a bonding agent. The adhesive part 251 adheres to the second polarization film 217 and the touch panel 230. The airing portion 255 may include an airing tissue that is additionally attached to the adhesive part 251. In the illustrated embodiment, the airing portion 255 is disposed between the touch panel 230 and the adhesive part 251, as opposed to between the second polarization film 217 and the adhesive part 251 as in the prior embodiment.

For example, the adhesive part 251 having the airing portion 255 that is attached thereto is adhered in a peripheral area PA of the display panel 210, and then the touch panel 230 is attached to the adhesive part 251 to complete the touch-screen display device 200. Alternatively, the adhesive part 251 having the airing portion 255 that is attached thereto is adhered in a rear surface of the touch panel 230, and then the touch panel 230 is attached to the display panel 210 to complete the touch-screen display device 200.

Figure 5:
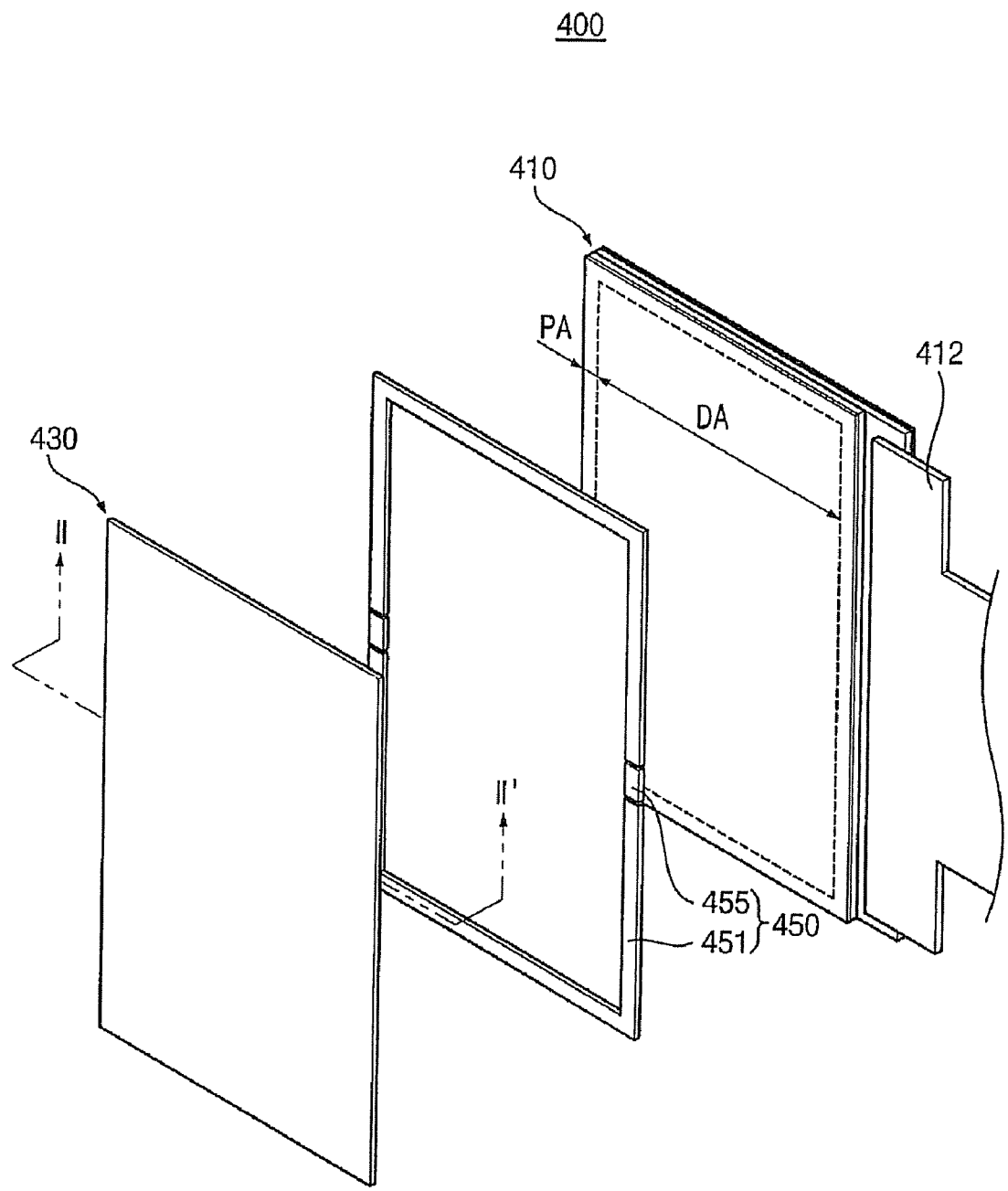
FIG. 5 is an exploded perspective view illustrating an exemplary touch-screen display device according to an exemplary embodiment of the present invention.
Figure 6:
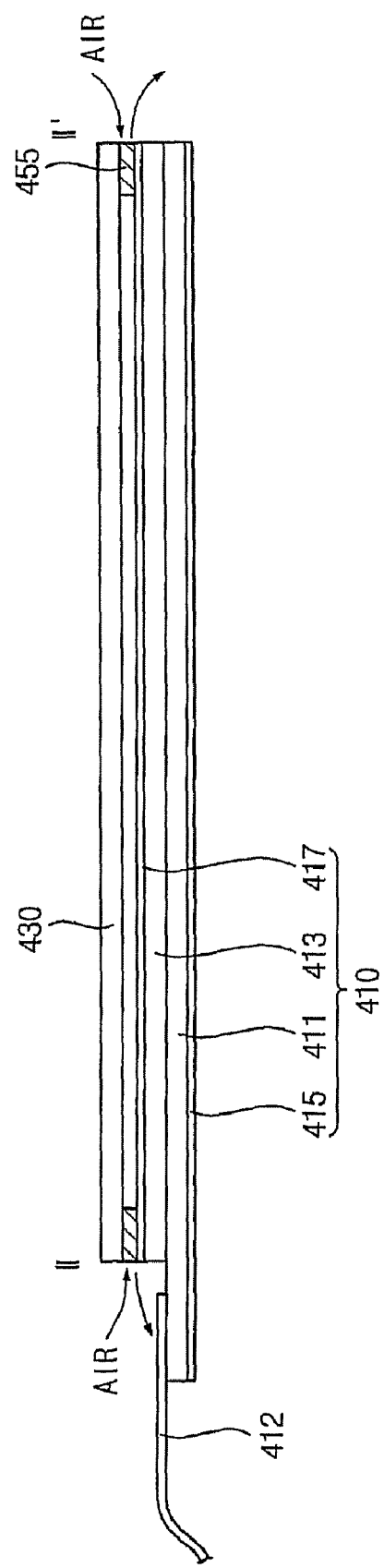
FIG. 6 is cross-sectional view taken along line II-II' in FIG. 5.

FIG. 5 is an exploded perspective view illustrating an exemplary touch-screen display device according to an exemplary embodiment of the present invention. FIG. 6 is a cross-sectional view taken along line II-II' in FIG. 5.

Referring to FIGS. 5 and 6, a touch-screen display device 400 includes a display panel 410, a touch panel 430, a first polarization film 415, a second polarization film 417, an adhesive member 450, and a flexible printed circuit board 412.

The touch-screen display device 400 is substantially the same as the touch-screen display device described with respect to FIGS. 1 to 3 except for a disposing position of the adhesive member 450.

Accordingly, the first substrate 411, the second substrate 413, and the second polarization film 417 are sequentially disposed on the first polarization film 415, and the liquid crystal layer is interposed between the first and second substrates 411 and 413.

The touch panel 430 is disposed separately from the second polarization film 417.

The adhesive member 450 is disposed between the second polarization film 417 and the touch panel 430 in correspondence to a peripheral area PA that is defined in the display panel 410.

The adhesive member 450 includes an adhesive part 451 and an airing portion 455.

The adhesive part 451 includes, for example, an adhesive tape or film. When the adhesive part 451 includes an adhesive tape or film, two central portions of the adhesive part 451 corresponding to the peripheral long sides of the display panel 410 are removed. Accordingly, an opening portion that is connected through the touch panel 430 and the display panel 410 is formed in the adhesive part 451. In other words, the adhesive part 451 may include two substantially U-shaped sections that are spaced apart at end portions thereof to form the opening portions there between. Alternative numbers of sections may also be provided to provide an alternative number of opening portions between the end portions of the sections of the adhesive part 451. The adhesive part 451 may also include a bonding agent selectively applied to portions of the peripheral area PA, while not applying the bonding agent to certain portions of the peripheral area PA to correspond to opening portions between the applied portions.

The airing portion 455 may include an airing tissue. For example, the airing portion 455 may be a non-woven fabric. The Each airing portion 455 may be disposed in the peripheral area PA where the adhesive part 451 is opened. That is, the airing portion 455 may be positioned within the opening portions formed between end portions of the adhesive part 451. Accordingly, the airing portion 455 makes contact with both the touch panel 430 and the display panel 410. In the illustrated embodiment, the adhesive part 451 and the airing portion 455 are not laminated on top of each other, and are formed on the same layer of the touch-screen display device 400. Edges of the end portions of the adhesive part 451 and the airing portion 455 may contact each other. Therefore, the display panel 410 is separated by a predetermined interval from the touch panel 430.

Figure 7:
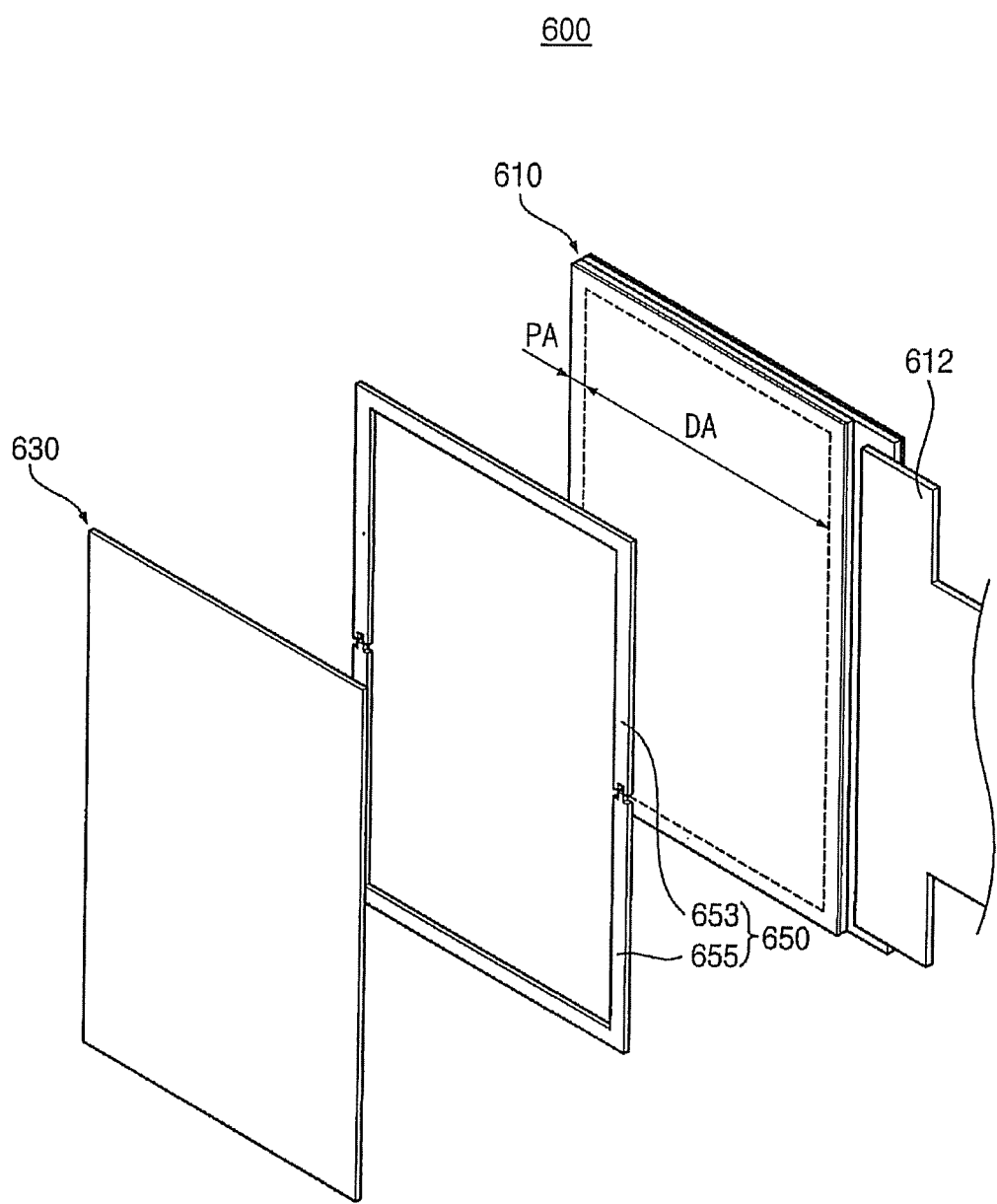
FIG. 7 is an exploded perspective view illustrating an exemplary touch-screen display device according to an exemplary embodiment of the present invention.
Figure 8:
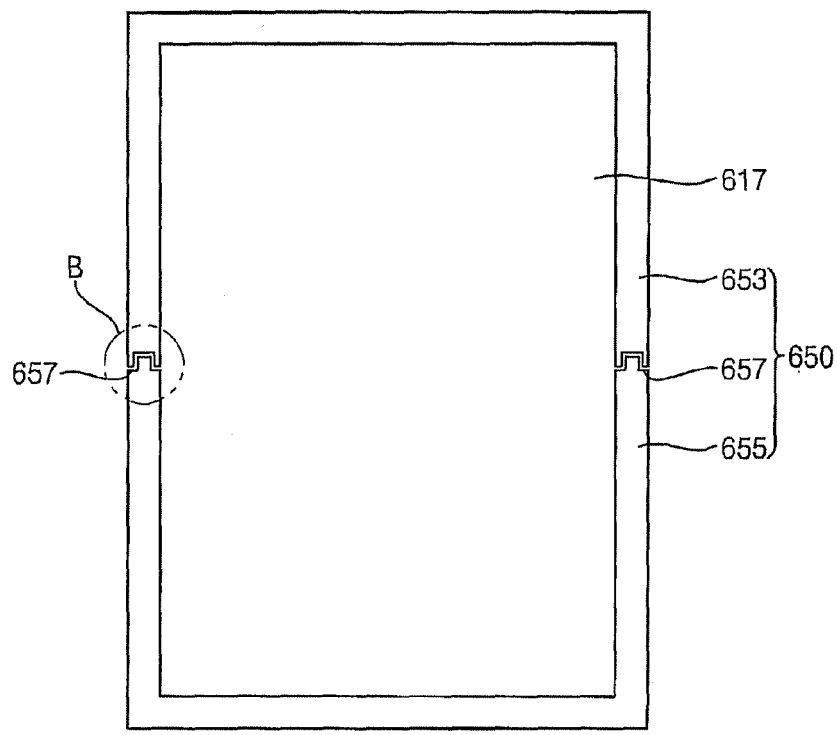
FIG. 8 is a plan view illustrating a portion of the exemplary touch-screen display device shown in FIG. 7.

FIG. 7 is an exploded perspective view illustrating an exemplary touch-screen display device according to an exemplary embodiment of the present invention. FIG. 8 is a plan view illustrating a portion of the exemplary touch-screen display device shown in FIG. 7.

Referring to FIGS. 7 and 8, a touch-screen display device 600 includes a display panel 610, a first polarization film, a second polarization film 617, a touch panel 630, and an adhesive member 650.

The touch-screen display device 600 is substantially the same as the touch-screen display device described with respect to FIGS. 1 to 3 except for the airing portion, which in this case is embodied by an airing path 657 corresponding to the adhesive member 650, and a shape of the adhesive member 650.

Accordingly, the first substrate, the second substrate, and the second polarization film 617 are sequentially disposed on the first polarization film, and the liquid crystal layer is interposed between the first and second substrates of the display panel 610.

The touch panel 630 is disposed separately from the second polarization film 617.

The adhesive member 650 is disposed between the second polarization film 617 and the touch panel 630 in correspondence to a peripheral area PA that is defined in the display panel 610. The adhesive member 650 attaches the display panel 610 to the touch panel 630. An airing path 657 is formed in the adhesive member 650. Accordingly, an air may be inflowed from an exterior of the touch-screen display device 600 to the space between the touch panel 630 and the display panel 610 through the airing path 657. Alternatively, an air may be exhausted from the space between the touch panel 630 and the display panel 610 to an exterior of the touch-screen display device 600 through the airing path 657.

For example, the adhesive member 650 may include a first adhesive tape or film 653 and a second adhesive tape or film 655 that are disposed along the peripheral area PA.

The first adhesive tape 653 may have a C-shape, and is disposed in a short side peripheral area PA of the display panel 610. Two first end portions of the first adhesive tape 653 are each extended to a central portion of a long side peripheral area PA of the display panel 610 along the peripheral area PA.

The second adhesive tape 655 may also have a C-shape. The second adhesive tape 655 is disposed in a short side peripheral area PA that faces a short side that is disposed in the first adhesive tape 653. Two second end portions of the second adhesive tape 655 are each extended to a central portion of a long side peripheral area PA of the display panel 610 to face the first end portions of the first adhesive tape 653 along the peripheral area PA.

While FIGS. 7 and 8 illustrate the adhesive member 650 as having a pair of adhesive tapes 653, 655 forming a pair of airing paths 657 there between, it should be understood that an alternate number of airing paths 657 and a corresponding alternate number of adhesive tapes may be formed in the touch-screen display device 600. Also, while the airing paths 657 are shown as disposed on central portions of the long sides of the peripheral area PA, alternate positionings of the airing paths 657 along the peripheral area PA would also be within the scope of these embodiments.

Figure 9:
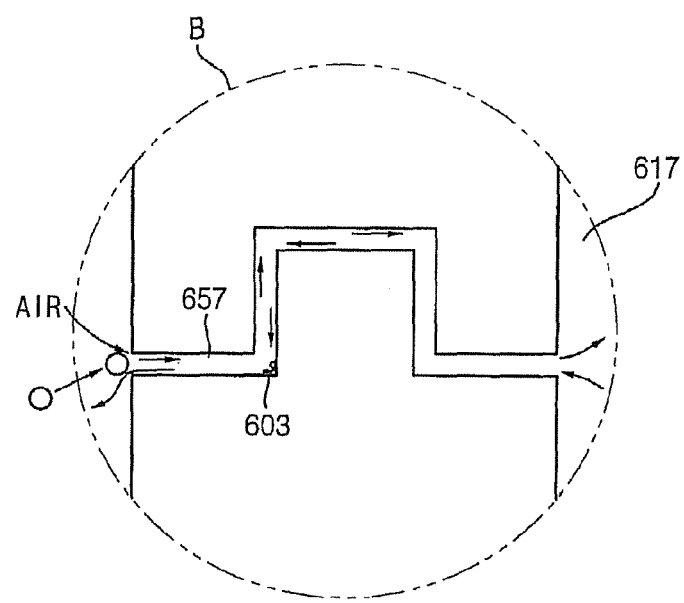
FIG. 9 is an enlarged view illustrating portion B shown in FIG. 8.

FIG. 9 is an enlarged view illustrating portion B shown in FIG. 8.

Referring to FIGS. 8 and 9, the airing path 657 is defined by a first end portion edge of the first adhesive tape 653, a second end portion edge of the second adhesive tape 655 that faces the first end portion edge, the display panel 610 (or the second polarization film 617) and the touch panel 630. The second end portion edge of the second adhesive tape 655 is separated by a predetermined interval from the first end portion edge of the first adhesive tape 653 to define the airing path 657 there between.

To prevent substances from inflowing into the space between the touch panel 630 and the display panel 610, for example, particles 603 such as dust, the airing path 657 may be bent in one or more positions. Accordingly, a length of the airing path 657 is greater than a width of the first and second adhesive tapes 653 and 655. The airing path 657 may form a non-linear conduit between the exterior and the space. In the present exemplary embodiment, the first end portion edge is formed with a first embossing shape, and the second end portion edge is formed with a second embossing shape that is engaged to the first embossing shape. In other words, one of the first and second end portion edges may include a protrusion and the other of the first and second end portion edges may include a correspondingly shaped concavity.

For example, as shown in FIG. 9, a hole such as a cavity or indentation is formed in the first end portion edge, and a protrusion that is inserted into the hole is formed in the second end portion edge. The hole and the protrusion each include angular corners, such as formed by rectangular-shaped hole and rectangular-shaped protrusion. As a result, the airing path 657 that is defined by the first end portion edge and the second end portion edge is bent at four positions.

To prevent the particles 603 from inflowing, the distance interval between the first end portion edge and the second end portion edge may be as small as possible. However, the first end portion edge may be separated by about 0.1 mm from the second end portion edge. For example, the first end portion edge may be separated by about 0.09 mm to 0.11 mm from the second end portion edge. Thus, the small distance between the first end portion edge and the second end portion edge of the first and second adhesive tapes 653, 655 as well as the bended nature of the airing path 657 prevents particles 603 from entering the space between the touch panel 630 and the display panel 610 while still allowing for air travel between the space and an exterior of the touch-screen display device 600.

Figure 10:
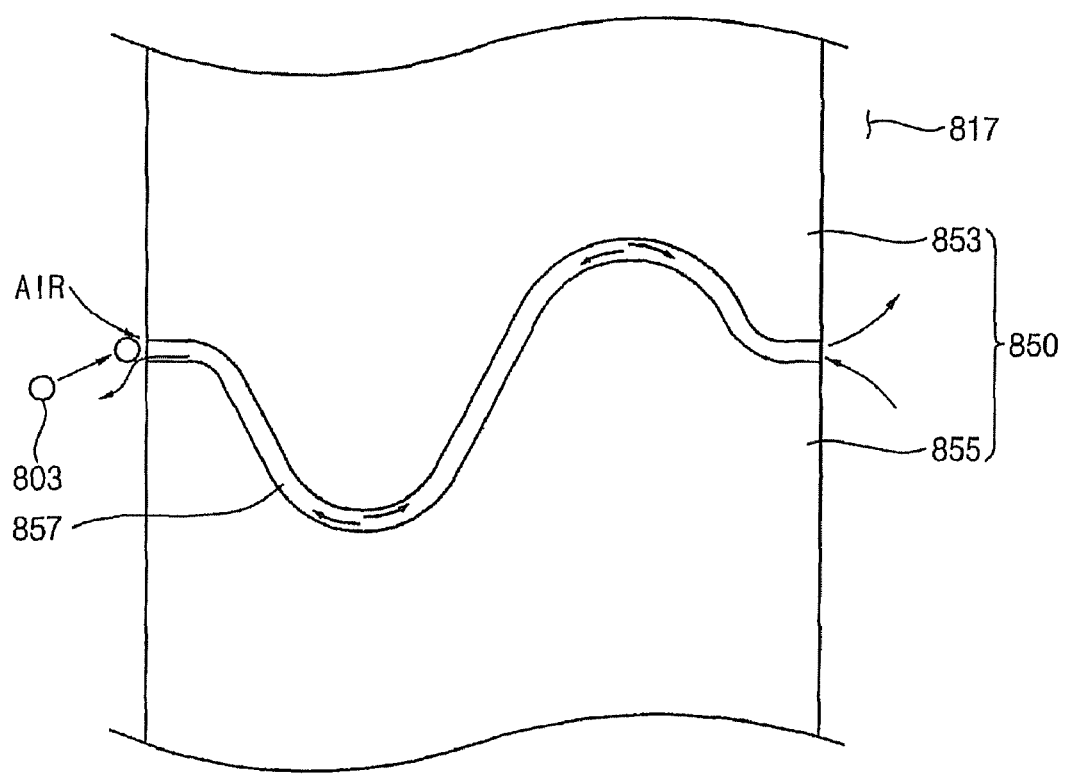
FIG. 10 is a plan view illustrating an exemplary touch-screen display device according to an exemplary embodiment of the present invention.

FIG. 10 is a plan view illustrating an exemplary touch-screen display device according to an exemplary embodiment of the present invention.

The touch-screen display device 800 is substantially the same as the touch-screen display device 600 shown in FIGS. 7 to 9 except for a shape of an airing path 857. Therefore, an adhesive member 850 that is attached to a second polarization film 817 is shown in FIG. 10.

Referring to FIG. 10, a touch-screen display device 800 includes a display panel, a first polarization film, a second polarization film, a touch panel, and an adhesive member 850. The adhesive member 850 may include a first adhesive tape 853, and a second adhesive tape 855. Alternatively, the adhesive member 850 may include an alternate number of adhesive tapes disposed in the peripheral area of the display panel to form the airing path 857 in an alternate number of locations within the peripheral area.

In one example, the airing path 857 is defined by a first end portion edge of the first adhesive tape 853, a second end portion edge of the second adhesive tape 855 facing the first end portion edge, the display panel (or the second polarization film 817), and the touch panel. The second end portion edge of the second adhesive tape 855 is separated by a predetermined interval from the first end portion edge of the first adhesive tape 853.

The first end portion edge is formed with a first embossing shape, and the second end portion edge is formed with a second embossing shape that is engaged to the first embossing shape, such as nested within the first embossing shape. The first and second embossing shapes are formed with a rounded shape, so that the airing path 857 is formed with a serpentine shape.

The airing path 857 inflows air from the exterior of the touch-screen display device 800 to the space between the touch panel and the display panel, or outflows air from the space to the exterior. However, particles 803 such as dust may not pass through the airing path 857. Even if a particle 803 passes through a portion of the airing path 857, the particle 803 becomes stagnant at a bent position of the airing path 857 because the airing path 857 is bent in a plurality of positions.

By employing the above-described exemplary embodiments of a touch-screen display device, a method of maintaining display quality of a touch-screen display device during a touch-screen function is made possible. Such a method may include providing an adhesive member between the touch panel and the display panel in an area corresponding to a peripheral area of a display area of the display panel, disposing an airing portion within at least a portion of the area corresponding to the peripheral area, maintaining an internal pressure of a space between the touch panel and the display panel to be substantially equal to an external pressure of air exterior to the touch-screen display device by passing air between the space and the exterior through the airing portion, and blocking a particle from entering the space through the airing portion.

As described above, according to the present invention, the touch panel and the display panel are coupled by the adhesive member, and the airing portion having an airing tissue or an airing path is also disposed in a peripheral area that is disposed by the adhesive member. Therefore, an air pressure between the touch panel and the display panel is changed in correspondence to the external air pressure. As a result, an error that occurs when the touch panel is not restored to the original state by ununiformly sticking the touch panel to the display panel may be prevented.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A touch-screen display device comprising:
a display panel having an effective area and a peripheral area surrounding the effective area;
a touch panel spaced apart from the display panel thereby forming an empty space between the touch panel and the display panel, the touch panel facing the display panel; and
an adhesive member including:
an adhesive part disposed along the peripheral area to surround the empty space between the touch panel and the display panel, and
an airing portion disposed along a portion of the peripheral area,
the adhesive part adhering the touch panel and the display panel to each other, and the airing portion blocking a particle from entering the empty space between the touch panel and the display panel, wherein the airing portion further inflows and outflows air from an exterior to the empty space.

2. The touch-screen display device of claim 1, wherein the adhesive part is an adhesive tape disposed between the display panel and the touch panel, which is disposed at an area corresponding to the peripheral area.

3. The touch-screen display device of claim 1, wherein the airing portion comprises a fiber having airing characteristics.

4. The touch-screen display device of claim 1, wherein the airing portion is disposed between the display panel and the adhesive part.

5. The touch-screen display device of claim 1, wherein the airing portion comprises a non-woven fabric.

6. The touch-screen display device of claim 1, wherein the display panel comprises,
a first substrate facing the touch panel;
a second substrate disposed between the first substrate and the touch panel, the adhesive member disposed on one surface of the second substrate facing the touch panel;
a liquid crystal layer disposed between the first substrate and the second substrate; and
a polarization film disposed between the second substrate and the adhesive part, the airing portion contacting the polarization film.

7. The touch-screen display device of claim 1, wherein the airing portion is between the touch panel and the adhesive part, and directly on the display panel.

8. The touch-screen display device of claim 1, wherein a portion of the adhesive part corresponding to the touch panel is exposed to form an opening portion,
the airing portion disposed in the opening portion of the adhesive part and making contact with the touch panel and the display panel.

9. The touch-screen display device of claim 1, wherein a first end surface of the airing portion makes contact with an external air, and a second end surface of the airing portion opposite the first end surface is exposed to the empty space between the touch panel and the display panel.

10. The touch-screen display device of claim 1, wherein the adhesive part is a bonding agent disposed between the display panel and the touch panel.

11. A touch-screen display device comprising:
a display panel having an effective area and a peripheral area surrounding the effective area;

a touch panel spaced apart from the display panel thereby forming an empty space between the touch panel and the display panel, the touch panel facing the display panel; and an adhesive member disposed along the peripheral area to surround the empty space between the touch panel and the display panel, and adhering the touch panel and the display panel to each other, the adhesive member having an airing path formed thereon, the airing path blocking a particle into the empty space between the touch panel and the display panel, wherein the airing path inflows and outflows air from an exterior to the empty space.

12. The touch-screen display device of claim 11, wherein the adhesive member comprises a first adhesive tape and a second adhesive tape that are disposed along the peripheral area, and, the airing path is defined by a first end portion of the first adhesive tape, a second end portion of the second adhesive tape that faces the first end portion, the display panel, and the touch panel.

13. The touch-screen display device of claim 12, wherein a length of the airing path is greater than a width of the first and second adhesive tapes.

14. The touch-screen display device of claim 13, wherein the first end portion is formed with a first embossing shape, and the second end portion is formed with a second embossing shape that is engaged to the first embossing shape.

15. The touch-screen display device of claim 14, wherein an interval gap between the first end portion and the second end portion is about 0.09 mm to about 0.11 mm.

16. The touch-screen display device of claim 11, wherein the airing path forms a non-linear conduit between the exterior and the empty space.

17. The touch-screen display device of claim 11, wherein the airing path maintains an internal air pressure of the empty space to be substantially equal to that of the exterior.

18. A method of maintaining display quality of a touch-screen display device during a touch-screen function, the touch-screen display device including a display panel and a touch panel, the method comprising:

providing an adhesive member between the touch panel and the display panel in an area corresponding to a peripheral area of a display area of the display panel, to surround an empty space formed between the touch panel and the display panel;

disposing an airing portion within at least a portion of the area corresponding to the peripheral area, the airing portion capable of blocking a particle from entering the empty space through the airing portion;

maintaining an internal pressure of the empty space between the touch panel and the display panel to be substantially equal to an external pressure of air exterior to the touch-screen display device by passing air between the empty space and the exterior through the airing portion.

19. The method of claim 18, wherein disposing an airing portion includes providing a tissue having airing characteristics between the touch panel and the display panel and blocking a particle from entering the empty space includes stopping the particle at the tissue.

20. The method of claim 19, wherein disposing an airing portion includes providing a non-linear conduit between the exterior and the empty space and blocking a particle from entering the empty space includes trapping the particle in a bend of the non-linear conduit.

* * * * *